(12) United States Patent
Fingerhut (10) Patent No.: US 8,233,429 B1
(45) Date of Patent: *Jul. 31, 2012

(54) METHOD OF PROVIDING TARGETED INFORMATION USING WIRELESS SUBSCRIPTION MANAGEMENT

(75) Inventor: Howard Fingerhut, Mendham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 3080 days.

This patent is subject to a terminal disclaimer.

(21) Appl. No.: 10/294,611

(22) Filed: Nov. 15, 2002

Related U.S. Application Data (63) Continuation of application No. 09/749,836, filed on Dec. 28, 2000, now Pat. No. 6,493,327, which is a continuation-in-part of application No. 08/963,446, filed on Nov. 3, 1997, now Pat. No. 6,636,489.

(51) Int. Cl.
*H04W 4/00* (2009.01)
*H04M 1/00* (2006.01)

(52) U.S. Cl. ...... 370/328; 370/335; 370/342; 455/550.1

(58) Field of Classification Search ........................ None
See application file for complete search history.

(56) References Cited

U.S. PATENT DOCUMENTS

| | | | |
|---|---|---|---|
| 4,253,087 A | 2/1981 | Saal |
| 4,761,646 A | 8/1988 | Choquet |
| 4,825,204 A | 4/1989 | Nakamura |
| 4,825,448 A | 4/1989 | Critchlow |
| 4,956,852 A | 9/1990 | Hodge |
| 4,993,059 A | 2/1991 | Smith |
| 4,996,524 A | 2/1991 | Tojima |
| 5,077,790 A | 12/1991 | D'Amico |
| 5,204,669 A | 4/1993 | Dorfe |
| 5,297,191 A | 3/1994 | Gerszberg |
| 5,373,288 A | 12/1994 | Blahut |
| 5,386,455 A | 1/1995 | Cooper |
| 5,410,543 A | 4/1995 | Seitz |
| 5,440,541 A | 8/1995 | Iida |
| 5,465,251 A | 11/1995 | Judd |
| 5,511,065 A | 4/1996 | Yonehara |
| 5,530,896 A | 6/1996 | Gilbert |
| 5,537,610 A | 7/1996 | Mauger |
| 5,539,390 A | 7/1996 | Nagano |
| 5,559,503 A | 9/1996 | Blahut |
| 5,586,269 A | 12/1996 | Kubo |
| 5,603,084 A | 2/1997 | Henry, Jr. |
| 5,608,871 A | 3/1997 | Murono |
| 5,654,985 A | 8/1997 | Crayford |

(Continued)

FOREIGN PATENT DOCUMENTS

EP 0 679 040 10/1995

(Continued)

*Primary Examiner* — Melanie Jagannathan
(74) *Attorney, Agent, or Firm* — Hope Baldauff Hartman, LLC (57) ABSTRACT

A wireless communication device receives targeted information and/or advertisements. The wireless communication device is preprogrammed with a generic network address only. To communicate over a network, the wireless communication sends an activation request message to the network, including its generic network address (GNA) and information indicative of the base station via which communication is taking place. Knowing the geographical location of the base station, it is possible to send to the wireless communication device via its GNA, or a subsequently provided unique network address (UNA), information or advertisements targeted to the geographical location or particular wireless device.

21 Claims, 7 Drawing Sheets

U.S. PATENT DOCUMENTS

| | | | |
|---|---|---|---|
| 5,731,757 A | 3/1998 | Layson, Jr. | |
| 5,754,953 A | 5/1998 | Briancon | |
| 5,828,956 A | 10/1998 | Shirai | |
| 5,835,858 A | 11/1998 | Vaihoja | |
| 5,838,252 A | 11/1998 | Kikinis | |
| 5,872,921 A | 2/1999 | Zahariev | |
| 5,875,394 A | 2/1999 | Daly | |
| 5,956,636 A | 9/1999 | Lipsit | |
| 6,188,899 B1 * | 2/2001 | Chatterjee et al. | 455/435.1 |
| 6,230,150 B1 | 5/2001 | Walker | |
| 6,243,772 B1 | 6/2001 | Ghori | |
| 6,393,270 B1 * | 5/2002 | Austin et al. | 455/411 |
| 6,493,327 B1 * | 12/2002 | Fingerhut | 370/328 |
| 2005/0079863 A1 * | 4/2005 | Macaluso | 455/419 |
| 2005/0164691 A1 * | 7/2005 | Payne | 455/419 |
| 2006/0009217 A1 * | 1/2006 | Lunden et al. | 455/435.1 |

FOREIGN PATENT DOCUMENTS

| | | |
|---|---|---|
| EP | 0 757 502 | 2/1997 |
| EP | 0 779 759 | 6/1997 |
| WO | 97/14258 | 4/1997 |

\* cited by examiner

METHOD OF PROVIDING TARGETED INFORMATION USING WIRELESS SUBSCRIPTION MANAGEMENT

This application is a continuation application of U.S. Ser. No. 09/749,836 filed Dec. 28, 2000 now U.S. Pat. No. 6,493,327, which is a continuation-in-part application of U.S. Ser. No. 08/963,446 filed Nov. 3, 1997 U.S. Pat. No. 6,636,489, herein incorporated by reference.

BACKGROUND

1. Field of the Invention

The present invention relates to a method and a system for activating a wireless device. More particularly, the present invention provides for an automated process for managing an over-the-air activation, deactivation, or change of service for a two-way wireless communication device, e.g., a radio modem such as a pager or a wireless phone. The over-the-air operations are performed via a wireless subscription management network.

The present invention is also directed to a method and system for conducting market research using wireless subscription management and, where appropriate, exploiting that market research to deliver to wireless device users targeted information and/or advertising.

2. Background of the Invention

A conventional wireless electronic communication device, for example a radio modem such as a two-way pager, is traditionally put into service for a customer through a service provider. The service provider may be a different entity than a network provider, i.e., the entity providing the wireless communications infrastructure, such as a MOBITEX network (the de facto international standard for two-way wireless data communications). As is known in the art, a basic MOBITEX network includes base stations, local switches, national switches, and a network control center.

The activation process for a particular communication device generally requires that, once the service provider determines that the customer should be authorized for service, the service provider contacts the network provider. The determination if and how to activate the communication device can be based on a number of factors, such as user provided information (for example, the user's credit report, service area, type of services requested and price option). The service provider then provides to the network provider, for example, the serial number assigned by the manufacturer of the communication device and a unique network address of the device (UNA), also assigned by the manufacturer. The network provider then activates the device.

The activation process itself is performed manually, i.e., the required user information must be provided to and then processed by the service provider and subsequently forwarded to the network provider. Further, the activation process is not generally performed in real-time. The activation process also presumes a number of different operations that are performed by the manufacturer at the time the device is manufactured, such as the manual programming of a unique network address (UNA) for each communication device. Thus, the activation process can be labor-intensive and costly.

Every conventional wireless device has a unique network address, e.g., a unique phone number or equivalent identifier so that signals can be directed to a particular device. As indicated above, the manufacturer must assign this unique network address to the device at the time of assembly. Even if the communication device, such as a radio modem, is not activated at the time of manufacture, the device is nevertheless assigned a unique network address from a limited pool of such addresses. The manual assignment of a unique address at the time of manufacture increases the cost of manufacturing each wireless device, and requires that careful records be kept of network addresses used to avoid any duplication.

UNAs assigned to manufacturers will become increasingly difficult to manage as the volume of units required to fulfill market requirements grows. The current manual process of multiple services will become cost prohibitive. Assigning UNAs begins with the allocation of a range of UNAs to a radio modem manufacturer. The manufacturer then programs a UNA into each radio modem and records the UNA and manufacturer serial number pair. An electronic copy of a list with the UNAs is provided to the network operator who will provide service for the devices. Since there are different operators and various ranges assigned to each operator, activation of each device is typically a manual (and therefore error-prone process). Similarly, changing the UNA from a local to regional or international UNA, or to the address range of another operator also requires a manual change process. For example, user and operator exchange of account and device information, address, and manufacture number, are done via fax, voice call, or E-mail. The information is then manually entered into an account management system. Such a process is not only costly and time consuming, but also yields a relatively high number of errors that also need to be corrected via manual trouble shooting and resolution procedures. For high volume, low margin markets, such as paging, the current method of operation is cost prohibitive.

Further, the finite address space and international numbering plan needed to support MOBITEX creates an added level of complexity, cost, and security risk resulting in the proliferation of radio modem programming tools. This is another problem that must be addressed. Since UNA space is limited, controlled allocation and reprogramming of UNAs is necessary. The variety of tools and skills required to program radio modems also represents a sales impediment in addition to the security risk and potential for error. Further, limiting the access to tools that permit reprogramming of UNAs increases system security and decreases the rate of errors while improving customer satisfaction and convenience.

Further still, there are many wireless device applications for which it may not be desirable to assign a unique network address (UNA) to a wireless device that identifies that device for its entire life. For example, in some applications a wireless device might be used only periodically, e.g., once per day, week or month. In view of the limited number of available UNAs, it is wasteful and uneconomical to assign a UNA to a wireless device that operates periodically or sporadically.

SUMMARY OF THE INVENTION

In accordance with the present invention, there is provided a wireless subscription management system and a method for an automated, over-the-air process of managing and administering wireless communication devices. Further, the present invention minimizes manual process and data entry error in addition to simplifying the distribution, production and programming of wireless devices.

Further still in accordance with the present invention there is provided a wireless subscription management system and method that dynamically assigns unique network addresses. More specifically, a wireless device queries the service provider for a UNA and thereafter registers with a service provider for only a limited period of time after which the UNA that was associated with that wireless device is returned to a pool of UNAs from which individual UNAs are pulled for dynamic association with or allocation to other wireless devices. This aspect of the present invention is advantageously used with wireless devices associated with fixed sites including, for example, (i) "intelligent" vending machines that may alert an owner that merchandise inventory has fallen below a predetermined threshold, (ii) burglar/fire alarms that only need to send information when the alarm is tripped or (iii) television set-top boxes via which pay-per-view programming or even products and/or services can be offered for sale and bought.

Also in accordance with the present invention, the service provider (or other entity, such as a host, in collaboration with the service provider) can detect and monitor which base station was used for wireless device registration. Accordingly, it is possible to determine (at least temporarily) where, geographically, the wireless device is located. This information can then be used to send targeted information or advertising to the wireless device via that base station or node. In other words, it is possible in accordance with the present invention to gather market research data regarding the location of the wireless devices that obtain UNAs using the wireless subscription management system.

It is therefore an object of the present invention to provide a system and method for dynamically associating a unique network addresses (UNA) to a wireless device upon request initiated by the wireless device.

It is yet another object of the present invention to provide a system and method for dynamic UNA allocation for wireless devices associated with fixed sites.

It is another object of the present invention to provide a system and method for dynamically allocating a UNA to a wireless device, wherein the wireless device is associated with a vending machine, alarm system, television, television set-top box and/or any other appliance such as a refrigerator, dishwasher or air conditioning system.

It is still another object of the present invention to detect the node or base station via which a wireless device has registered and thereafter deliver targeted information and/or advertising to that wireless device via that node using a unique network address assigned to the wireless device or using only the wireless device's generic network address.

These and other objects of the present invention will become apparent upon a reading of the following detailed description in conjunction with the accompanying drawings.

DETAILED DESCRIPTION OF THE INVENTION

Figure 1:
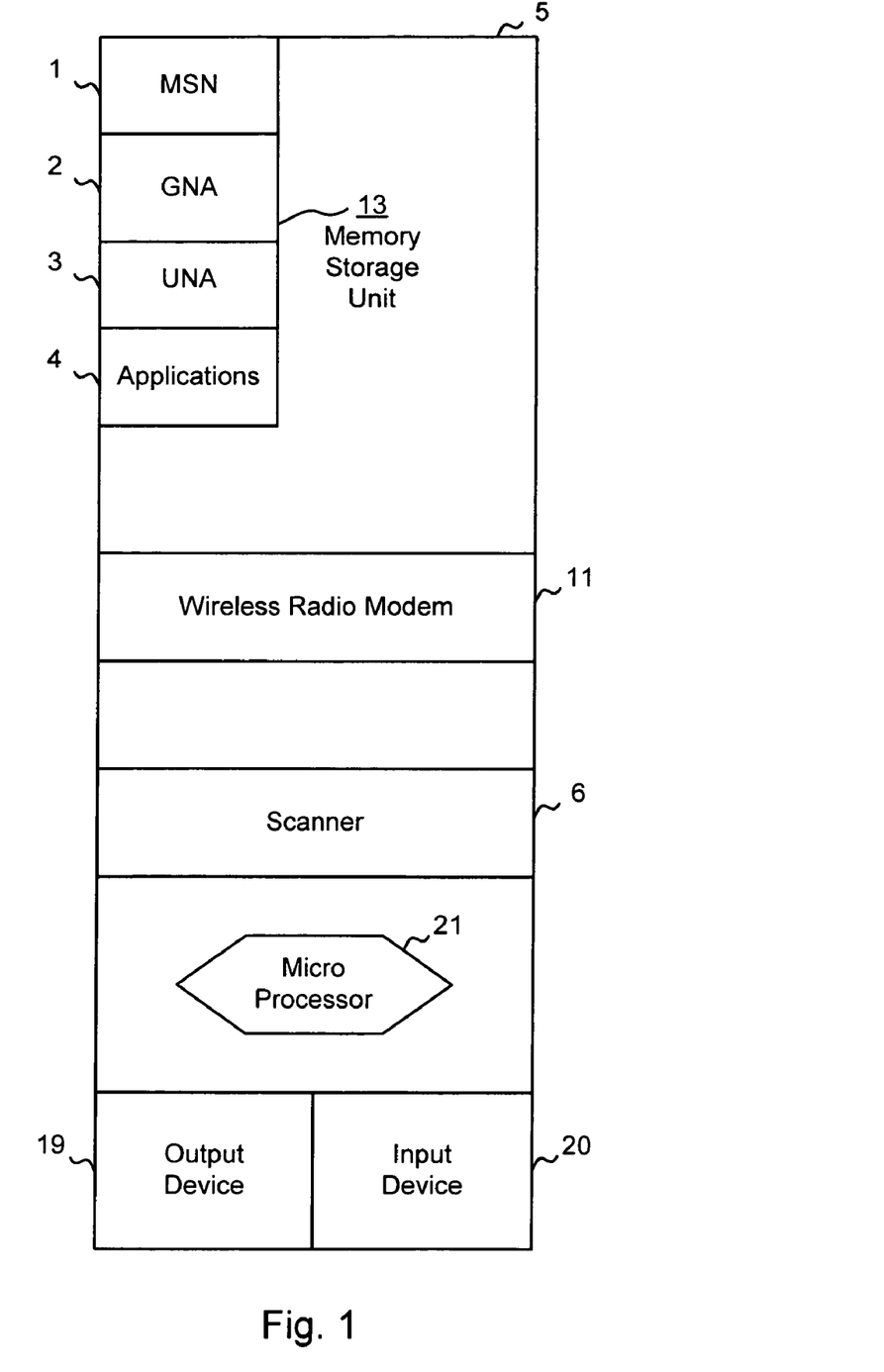
FIG. 1 shows an exemplary embodiment of a wireless communication device according to the present invention.

FIG. 1 shows a two-way wireless communication device 5 according to an embodiment of the present invention. The device 5 includes a memory storage unit 13. The memory storage unit 13 includes, for example, a location 1 into which a permanently assigned manufacturer serial number (MSN) is stored, and a location 3 for a programmable unique network address (UNA). According to the present invention, the UNA is not inserted into the location 3 at the time of manufacture of the device 5. Instead, the UNA is inserted during the OAA process according to the present invention as described in detail below. In addition, the memory storage unit 13 has a location 4 where, for example, an optional software application that initiates the OAA process is stored. The software application may also be in another device that may communicate with the device 5. At a minimum, the device 5 contains a software application that will respond to an activation request and corresponding network responses. Further, a location 2 of the memory storage unit 13 stores a generic network address (GNA), for example, assigned by the manufacturer of the device 5 at the time of manufacture.

The device 5 also has a scanning circuit 6 that searches for a control signal from the nearest base station in a wireless network 12 (See FIG. 4), and a wireless radio modem 11 that transmits and receives data to and from the network 12. In addition, the device 5 has an output device 19, e.g., LCD screen, and an input device 20, e.g., a numerical pad, keyboard and/or voice recognition device. The device 5 is also equipped with a microprocessor 21 which controls operation of the device 5.

The device 5 has, for example, two modes of operation: (1) an OAA process or pre-activated mode; and (2) an operational process or user mode.

Figure 2:
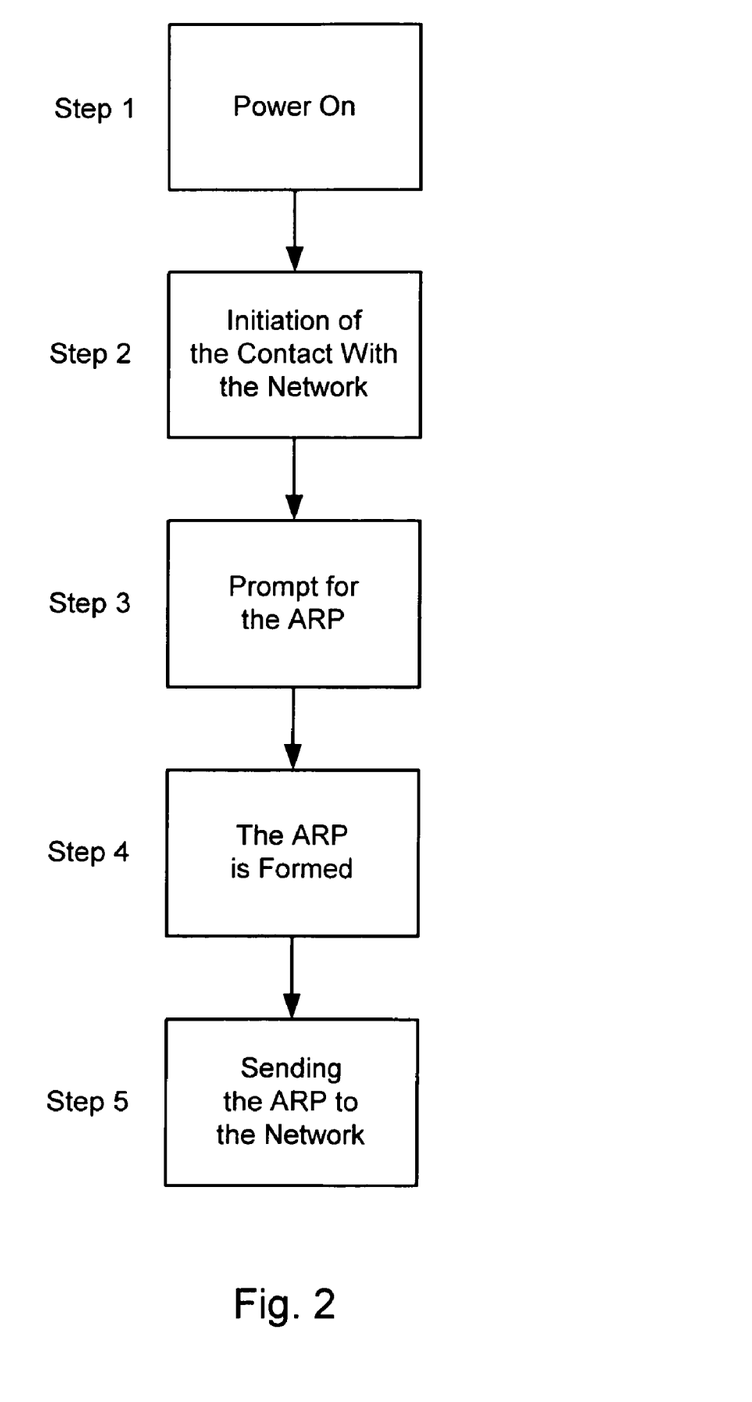
FIG. 2 shows a block diagram of an exemplary implementation of an over-the-air activation (OAA) process for the wireless communication device illustrated in FIG. 1.

FIG. 2 shows an exemplary initiation sequence of the OAA process mode according to an embodiment of the present invention. The initiation sequence of the OAA process includes, for example, five steps. The first step is to turn on the power to the device 5. The device 5 automatically determines that the UNA is not present in the location 3 of the memory storage unit 13 and initiates the OAA process, which is stored, for example, as an application program in location 4 of the memory storage unit 13. The second step is to establish contact with the wireless subscription network 12. The scanning circuit 6, which is, for example, preprogrammed at the time of assembly, or by the service provider 16 at the time of sale to the user, initiates a search for a usable communication channel of the network 12.

Once contact with the network 12 is established, the device 5, during the third step of the initiation sequence, prompts the user for the information required to activate the device 5 via, for example, the application software stored in location 4 of the memory storage unit 13. During the fourth step of the initiation sequence, the initial request for activation of the device 5 from the network 12 is formed via an activation-request packet (ARP) 7 generated by the application program. The fifth step is to send the ARP 7 from the device 5 to the network 12 via the wireless modem 11. Alternatively, steps 3 and 4 can be performed simultaneously or prior to step 2.

Figure 3:
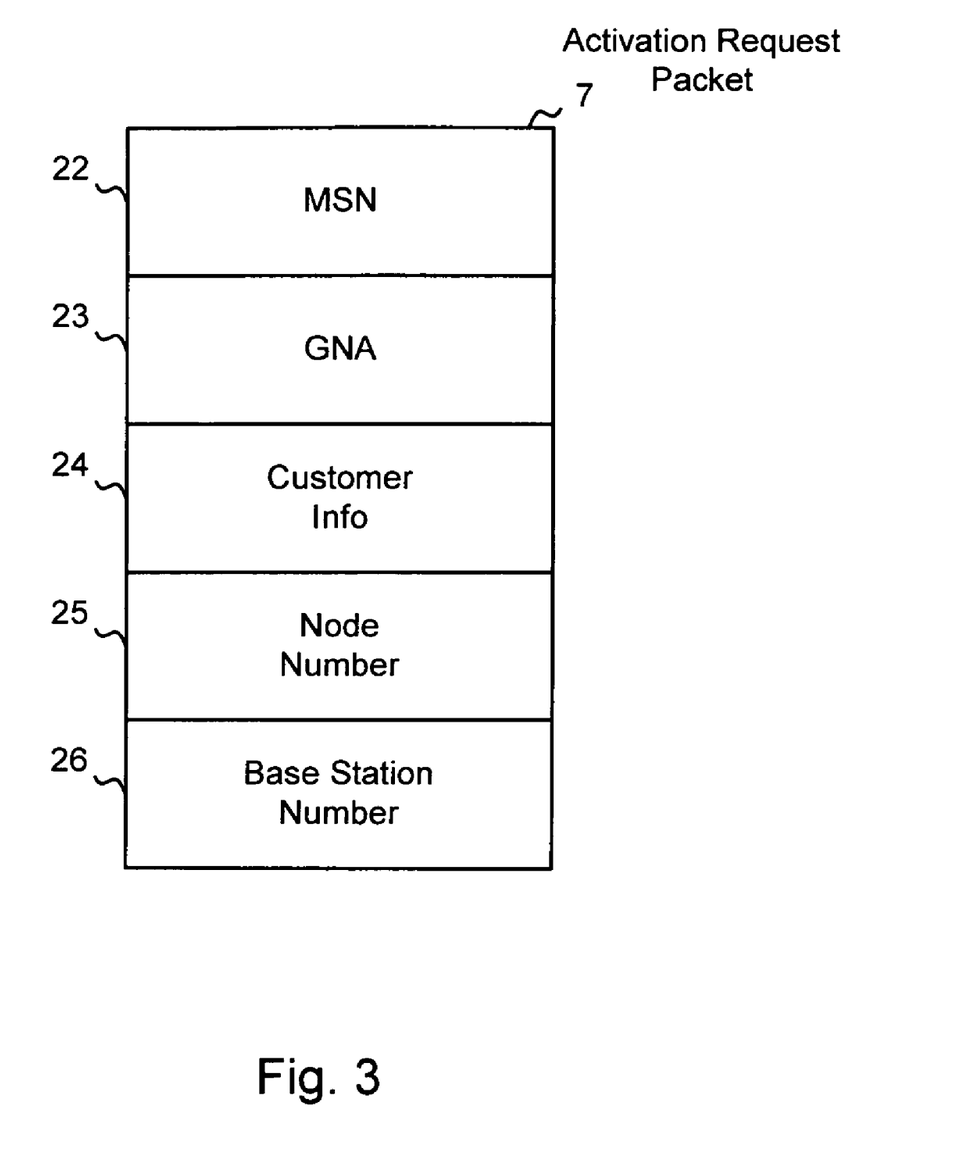
FIG. 3 shows the exemplary contents of an activation request message according to an exemplary embodiment of the present invention.

An exemplary format of ARP 7 is illustrated in FIG. 3. The ARP 7 utilizes, for example, packet data technology which, as is known in the art, carries finite or variable length blocks of data. These blocks of data are typically limited in size by packet switching infrastructure, for example, 512 bytes of information. Longer messages may be subdivided into multiple packets and reassembled automatically at the receiving end, as is also known in the art. Each packet of data is not necessarily a complete message, but rather contains up to 512 bytes of data. Each packet can be sent through different channels and is put together as a whole message upon receipt by the network 12. The use of packet data technology makes it difficult for unauthorized personnel to determine where a specific message begins and ends. Such a scheme also presents a highly efficient and reliable method to handle data.

As shown in FIG. 3, the ARP 7 includes, for example, a plurality of information fields. For example, a field 22 is for the MSN which may include such information as a model number and the identity of the manufacturer of the device 5 as well as a date of manufacture. In addition, the ARP 7 has a field 23 for the GNA and a user information field 24. The user information field 24 may contain, for example, personal information relating to the user, an area of desired coverage of the device 5, a method of payment, and/or a level of service. Further, the ARP 7 has a field 25 for optional network routing information so that the network can efficiently route response messages to the original point. The ARP 7 also has a field 26 for identifying information of the base station 10 that received the ARP 7 from the device 5.

All information fields in the ARP 7 can be encrypted. Each field of the ARP 7 may have, for example, a different encryption scheme, or, if desired, no encryption. This allows a further enhancement to the security of the device 5. Such a security scheme provides an advantage to the service provider 16 because, for example, the user information field 24 (which information is only required by the service provider 16), may be encrypted using a different encryption scheme than the network provider 28 information, and thus can be kept secret from the network provider 28.

Figure 4:
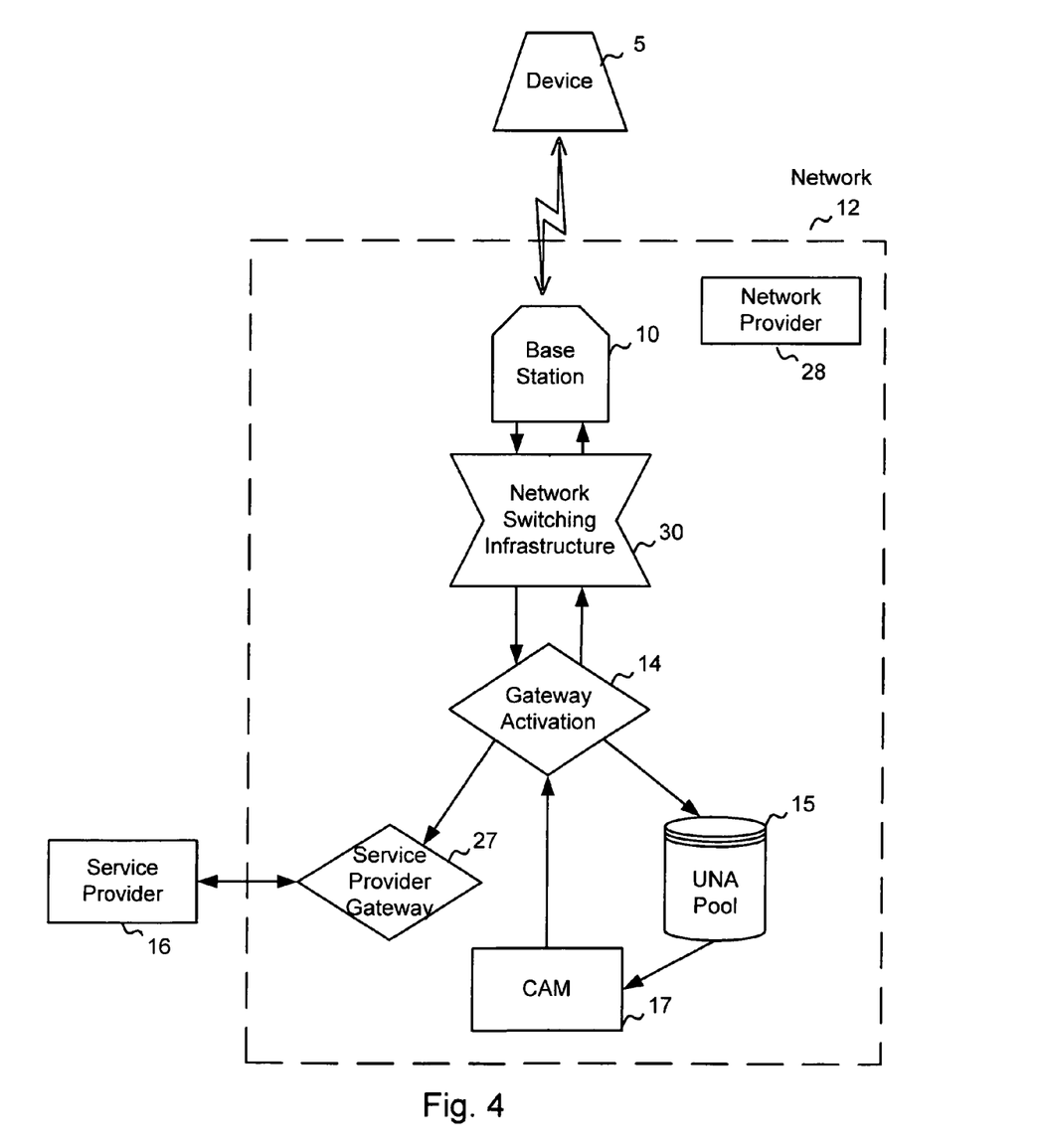
FIG. 4 shows a data flow in the wireless subscription management network according to an exemplary embodiment of the present invention.

FIG. 4 shows the flow of data in the network 12. When the ARP 7 is transmitted by the device 5 via the modem 11 to the network 12, the base station 10 which receives the ARP 7 inserts a node number (e.g., routing information) into the field 25 and optionally inserts a node number and base station number into fields 25 and 26, correspondingly. The network 12 decrypts the ARP 7, except for the personal information. If the MSN and the GNA of the ARP 7 match the MSN and the GNA provided by the manufacturer of the device 5 and stored in a database of network 12, then the network 12 accepts the ARP 7. Subsequently, the network 12 routes the ARP 7 via a network switching infrastructure 30, such as a MOBITEX network, to a gateway 14 which facilitates the automated process of assigning a UNA to the device 5 and activating the device on the network 12. The gateway 14 sends an authorization request to the service provider 16 for verification.

The verification can be done, for example, via a service provider gateway 27 connected to the gateway 14. The service provider gateway 27, like the gateway 14, is, for example, a processor based device, such as a computer or a network server, that may contain an authentication program developed by the service provider 16 which includes the authentication criteria of the service provider 16. The service provider 16 evaluates the ARP 7 and if it is approved, authorization is sent to the gateway 14. At the time the ARP 7 is received, the gateway 14 selects a UNA from a UNA pool 15, which is stored, for example, in a UNA database in the network 12, and provides the UNA to the service provider gateway 27. Thus, if the service provider gateway 27 determines that the authentication request is approved, the UNA is already available to be provided to the device 5. Then, the network 12 informs a Client Account Management database (CAM) 17 that the UNA is being assigned to the client. The CAM 17 keeps track of all records of assigned and available UNAs.

However, if the authentication request is denied, however, then the gateway 14 is so informed and the UNA can be returned to the UNA pool 15. If the service is authenticated for the device 5, then the UNA is inserted into the field 34 of an activation response packet 18.

Figure 5:
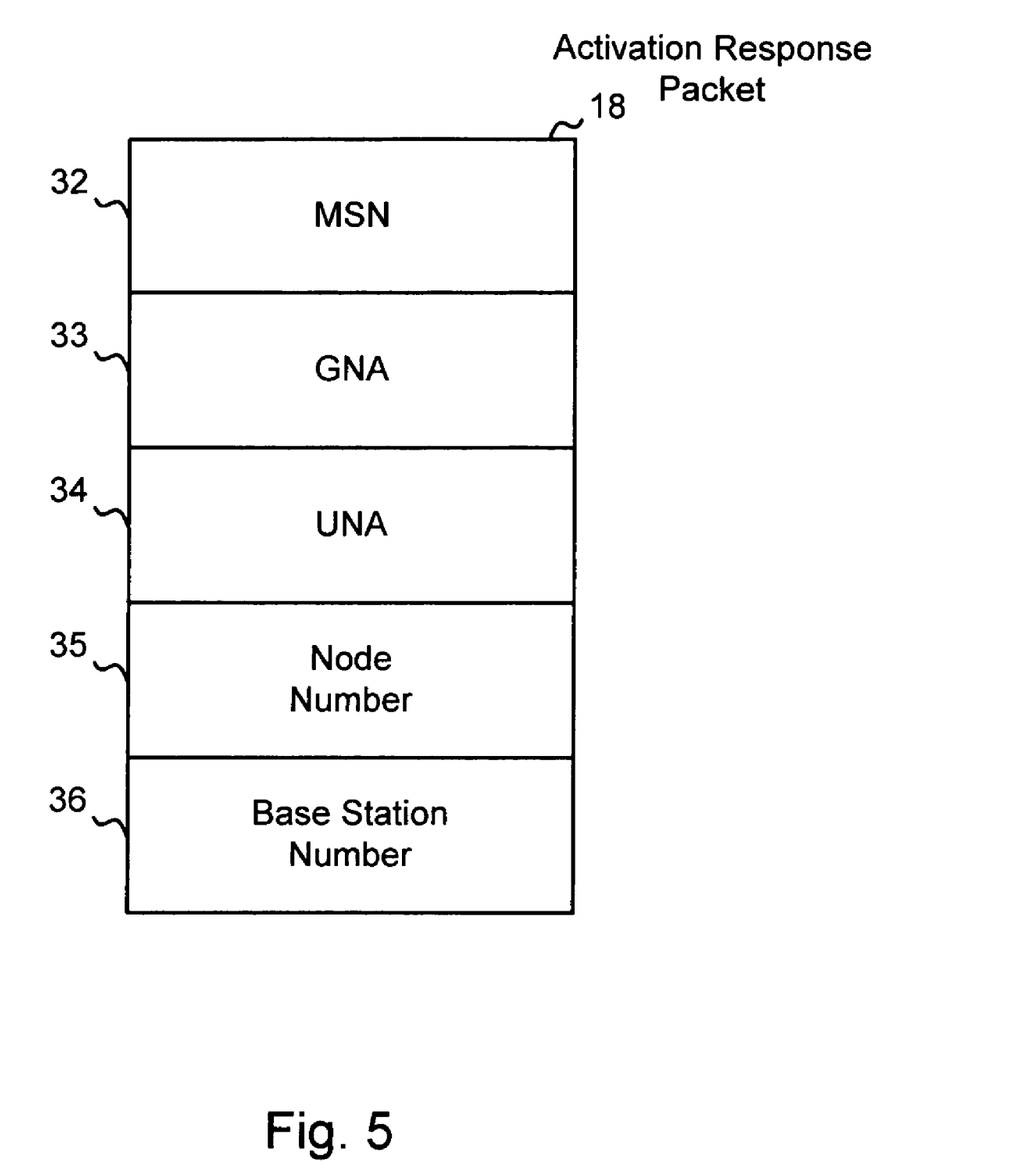
FIG. 5 shows the exemplary contents of an activation response message according to an exemplary embodiment of the present invention.

The response packet 18 is generated by the gateway 14, and includes, for example, as shown in FIG. 5, a field 32 for the MSN, a field 33 for the GNA, a field 34 for the UNA, a field 35 for the node number, and a field 36 for the base station number. The present invention has an advantage over existing systems in that it also provides an opportunity for the service providers 16 to insert into the response activation packet 18, for example, a welcome message, user instructions, and marketing information.

Each field of the response packet 18, as in the ARP 7, can be encrypted utilizing different encryption algorithms. Such a scheme allows the service provider 16 to limit the access of others to certain fields of the response packet 18. The network provider 28, on the other hand, may limit access to the field 34 where the UNA is stored. The present invention by the use of a GNA initially programmed into the communication device 5 and by the subsequent over-the-air provision of a UNA at the time of activation of the device 5 or other selected time, further allows the service provider 16 and the network provider 28 to have full control of activating, authenticating and authorizing the devices 5. This eliminates the need for specific configuration tools that might be acquired or used by unauthorized personnel.

Another advantage of the present invention is that the response packet 18 does not have to be broadcast nationally. For example, during the OAA process according to the present invention, the user stays in the same geographical location from which the user sent the ARP 7 until the device 5 is activated which takes, for example two minutes. In a conventional pager system, however, the location of a particular communication device is not known and thus a signal for a particular communication device must be transmitted throughout the entire coverage area of the wireless communications network. Further, a conventional pager system would only provide one way communication from the network to the communicating device and thus the network has no way of knowing where a particular communication device is located and therefore must broadcast a signal intended for the device throughout the entire coverage area. It also has no way of knowing that the device actually received the broadcast message. According to the present invention, however, the response packet 18 is transmitted and broadcasted through the base station 10 which originally received the ARP 7, thereby reducing the processing burden on the network 12. Once reprogrammed, the device 5 can provide notification that it has been reprogrammed.

If the device 5 does not receive the response packet 18 within, for example, two minutes, the device 5 will re-send the ARP 7. If, for example, three attempts to receive the response packet 18 fail, the device 5 will inform the user via the output device 19. If the activation response packet 18 has been received by the device 5, then it is decrypted. If the GNA and the MSN fields of the response packet 18 match corresponding fields of the device 5, then the UNA, which is stored in the field 24 of the response packet 18, is copied into the location 3 of the memory storage unit 13 of the communication device 5. This can be performed, for example, by writing the UNA into nonvolatile protected memory, such as a Flash PROM or EEPROM, once the UNA is properly decoded.

After the UNA is loaded over-the-air into the communication device 5, the device 5 restarts and sends, via the wireless modem 11 an encrypted message to the wireless network 12 informing the network 2 that the device 5 is "BORN", i.e. operational. The network 12 then registers the message and updates its database of operational devices 5. Subsequently, the network 12 sends to the device 5 a welcome message confirming its operational status. In the "welcome" message, the service provider 16 may include information which, for example, has confirmation and welcome messages from the service provider 16. Accordingly, the device 5 is now activated.

Eliminating the need for manufacturers to insert the UNA into the location 3 for every device 5 during the assembly process due to the use of the GNA reduces the cost of manufacturing device 5 which also translates to a lower cost of device 5.

Utilization of the GNA is an advantage of the present invention over existing systems. According to the present invention, a communication device 5 is pre-programmed with a common GNA during the manufacturing process. The use of a common GNA eliminates the need for allocating, at the time of manufacture, a UNA for every device 5 that may, for example, be placed in inventory for an extended period of time. Also, as a manufacturer may produce communication devices 5 for service providers 16 in various countries with each country having its own UNA assignments, without the use of a GNA in each device 5 according to the present invention, the manufacturer would have to assign a UNA for each communication device 5 based on, for example, a projection of the need for devices in each country. Such an arrangement, as exists in the prior art, can present a distribution problem. For example, if actual requirements for each country vary from the manufacturer's projections, this would result in manual UNA reprogramming of the communication devices or non-use of assigned UNAs. Further, without the use of GNA according to the present invention, even within a particular country, the use of pre-assigned UNAs limits the ability to allocate, for example, groups of sequential UNAs to, for example, a particular service provider as the pre-assignment of UNAs by manufacturer ties the allocation of the UNAs to particular communication devices 5 and not to the activation of the device 5. Thus, utilizing a GNA preserves and optimally utilizes the limited UNA pool 15. Additionally, recovery of the UNA from deactivated devices 5 can be significantly expedited. This can be performed by assigning the UNA of a deactivated device to a new device. If the old, deactivated device tries to communicate, the network will realize that the UNA is no longer assigned to the device because the serial number and UNA pair are no longer valid. Therefore, the network sends the device a message that prohibits further communication from the now deactivated device.

The method according to the present invention is also advantageous because it not only makes the OAA process available for the device 5, it also simplifies the activation process for the user of the communication device 5. For example, the device 5 can be activated and registered within, for example, two minutes compared to 45 minutes for conventional wireless communication systems. According to the present invention, for example, users will not have to fill out subscription forms or place calls to a customer service organization for activation. The entire OAA process is automated and requires no human intervention. In addition, the present invention allows the service provider 16, by sending a specific command (or by using a combination of events) over-the-air, in the same manner as the activation process, to quickly and efficiently disable the device 5 if, for example, the device 5 has been lost or is being used by an unauthorized user. Accordingly, the present invention significantly reduces the cost of activation or deactivation of the communication devices by eliminating the human resources and manual effort required to activate, deactivate or modify the communication devices.

Another advantage of the present invention is a capability to provide on-line help and service information. The present invention allows the user to have instant access to help and service information from the service provider gateway 14 during the OAA process.

In addition to the OAA process, the present invention allows the user to change, over-the-air, available service for the device 5. For example, once the device 5 is activated, it operates in the user's mode. The user can, however, follow steps that are substantially similar steps to the steps during the OAA process to effect further changes in service. The user, for example, may change a service level, area of coverage, or frequency band. Also when the user desires to deactivate the device 5, the steps of deactivation are generally similar to the steps of the OAA process. During the deactivation process, the UNA is removed from the location 3 of the memory unit 13 and returned to the UNA pool 15, and the network 12 updates CAM 17 database and sends, for example, a "DIE" message to the device 5.

The billing process for a wireless communication system is also simplified and more flexible according to the present invention. The present invention allows the user to select, as part of the authorization request process, different levels of services during the OAA process. The service provider 16 can also associate a block of UNAs with a particular service level and thus allow the network provider to activate a specific UNA for the requested service. Under such a scheme, the billing process is simplified for the service provider 16 since the UNAs can be allocated for services rather than to device manufactures.

One exemplary use of the present invention is in a car tracking device. The car tracking device can be similar to the device 5, except it is installed in a car and has only an automated mode which, for example, is pre-programmed at the time of assembly of the tracking device. Further, the tracking device, unlike the device 5, does not need the output device 19 or the input device 20. Instead, the tracking device incorporates, for example, a GPS system, which is capable of determining a geographical location of the car.

The tracking device can be preprogrammed to initiate contact with the wireless network 12 at predetermined tracking intervals, for example once a month. The tracking device transmits a message which is substantially similar to the ARP 7 and includes information such as the MSN and the GNA of the tracking device as well as the GPS information. Upon receiving the message, the wireless network 12 decrypts the MSN field and the GNA field, and compares them to the information stored in the wireless network 12 database. For example, if the car is supposed to be located in a defined geographical area, such as metropolitan New York City or New England, the car's actual location can be determined via the GPS data. If the car is not in the proper area, then an alarm can be activated, for example, to indicate that the location of the car needs to be investigated. The network 12 could then route a message to a predetermined party that tracks the geographical location of the car.

An advantage of the present invention, which is also embodied in the car tracking device set forth above, is that the tracking device does not utilize a UNA. Instead, a tracking device can utilize the GNA which can also be used for all tracking devices. As described, the identity of the car is determined upon looking at the MSN and the GNA combination.

In another aspect of the present invention, instead of device 5 being associated with a mobile entity, device 5 is associated with a fixed site device such as an "intelligent" vending machine, burglar/fire alarm or television set-top box, whereby the fixed-site device can communicate with a central location, e.g., vending machine owner, security office or police/fire station, or a cable or satellite television service provider's head end. As used herein, "fixed site device" is meant to include all devices that are typically non-mobile once they are in use, but does not mean that such devices cannot be moved at all. Fixed site devices may also include appliances such as refrigerators, dishwashers or air conditioning systems, for example.

In accordance with this aspect of the invention, location 4 of memory storage unit 13 in wireless device 5 preferably includes an application that includes interface functionality that allows wireless device 5 to interact with the fixed site device. Specifically, the application preferably is able to access memory in the fixed site device and transmit information concerning the status of the fixed site device or information concerning a request for service.

For example, in the case of a vending machine, the vending machine's owner may want to learn, on a periodic basis, the status of the inventory stored by the vending machine and/or whether sufficient monetary change (i.e., coins) is available. Device 5, when associated with such a vending machine, may pass this type of information via wireless network 12 to the vending machine owner. Since the vending machine likely needs to seldom send such information (e.g., only once per day, week or month) it is wasteful to assign to wireless device 5 associated with the vending machine a UNA which cannot be used by any other wireless device 5.

Figure 6:
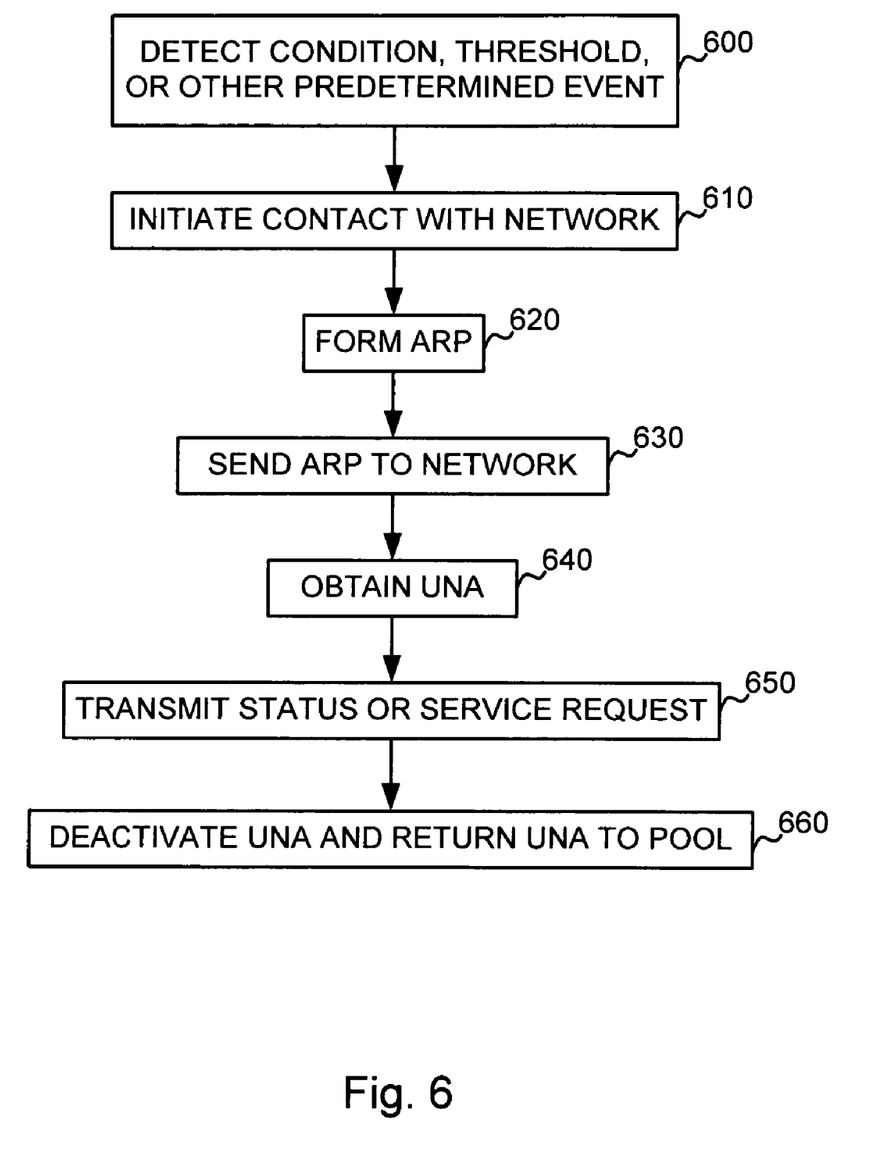
FIG. 6 is a flowchart of an exemplary series of steps in accordance with a another aspect of the present invention.

FIG. 6 shows an example of how the present aspect of the invention preferably functions. While FIG. 6 is described in the context of a vending machine, the method described can be applied to any fixed site device. At step 600, the vending machine detects a condition for which it is desired to contact the vending machine owner. Such a condition can be based on whether a particular time as been reached (e.g., the end of a 24-hour period), whether a threshold has been reached (e.g. low inventory, low "change") or whether any other predetermined event has occurred (e.g., a mechanical malfunction). At step 610 the fixed site device then causes device 5 associated with the fixed site device to initiate a similar course of steps as is illustrated in FIG. 2. That is, at step 610, contact is initiated with network 12. Then at step 620, an activation request packet (ARP) is formed. However, instead of customer information 24 (as shown in FIG. 3), this memory location instead preferably includes identification information for the vending machine via which the vending machine owner can identify precisely which vending machine is communicating. The vending machine can also be identified if a database is provided that matches the vending machine with a particular MSN of a wireless device 5.

At step 630 the ARP is sent to the network and thereafter, at step 640, device 5 associated with the vending machine receives and stores a UNA. Using this UNA the vending machine can then communicate with the vending machine owner (which, of course, could be an automated or computerized system, not necessarily a person) regarding its status or service request.

Finally, in accordance with this aspect of the present invention, when the communication is complete, the network or service provider preferably takes back the UNA. More specifically, device 5 associated with the vending machine preferably sends a deactivation request packet to network 12 whereby a "DIE" message, as previously explained, may be sent to device 5. As a result, the previously assigned UNA is deleted and returned to the UNA pool so that the UNA can thereafter be made available to another device 5 as necessary.

In accordance with this aspect of the present invention, instead of server provider gateway 27 being used primarily for authenticating ARPs, service provider gateway 27 preferably also includes computer equipment and/or messaging capability whereby the persons responsible for, for e.g., servicing the vending machine, are notified of the status or service request of the vending machine.

While the UNA dynamic allocation aspect of the present invention has been described with respect to an "intelligent" vending machine, other fixed site devices can also benefit from the method and system of this aspect of the present invention. For example, a burglar or fire alarm company might want to rely not only on conventional wireline telephone technology for communicating an alarm condition, but might also want alarming redundancy via a wireless network. Since burglar and fire alarms seldom occur, it is undesirable to assign a UNA to a device 5 associated with such alarm systems. Instead, the dynamic allocation of a UNA when an alarm event occurs is a much more desirable way to save the limited and therefore precious pool of available UNAs.

Still another advantageous use of this aspect of the present invention is to incorporate a device 5 in a television set-top box, or even directly in a so-called cable-ready television set. Such devices are becoming more "intelligent" in the sense that pre-paid programming can be offered via the set-top box and/or merchandise and/or services can be offered and purchased via the set-top box. In addition to having the conventional "cable" for communication between a customer and a central location (i.e., the head end of the cable provider), a cable company might want to add redundancy to its system and also include wireless connectivity. Further, in the case of satellite television, there is no cable that can provide communication between a customer and the cable provider. Accordingly, the telephone, or preferably in accordance with the present invention, a wireless network, is employed to establish the desired communication between the parties.

When a cable television set-top box is manufactured, the manufacturer likely does not know when or where the set-top box will ultimately be deployed. Thus, it is desirable, in accordance with the principles of the present invention, to pre-program each device 5 in a set-top box with a GNA and dynamically allocate a UNA when a customer desires to communicate with a central location in order to purchase products or services offered by the cable or satellite television provider. As a by-product of the OAA process of the present invention, the cable or satellite television operator also can detect which base station 10 was used by device 5 associated with the set-top box that connected with the network. Accordingly, the cable or satellite operator can broadcast information over that base station and address the information to the GNA whereby device 5, even not having been allocated a UNA, can receive general or geographically focused information, sales solicitations and the like. That is, market research concerning the general location of an appliance or a wireless device can be obtained by monitoring via which base station communication is taking place.

Figure 7:
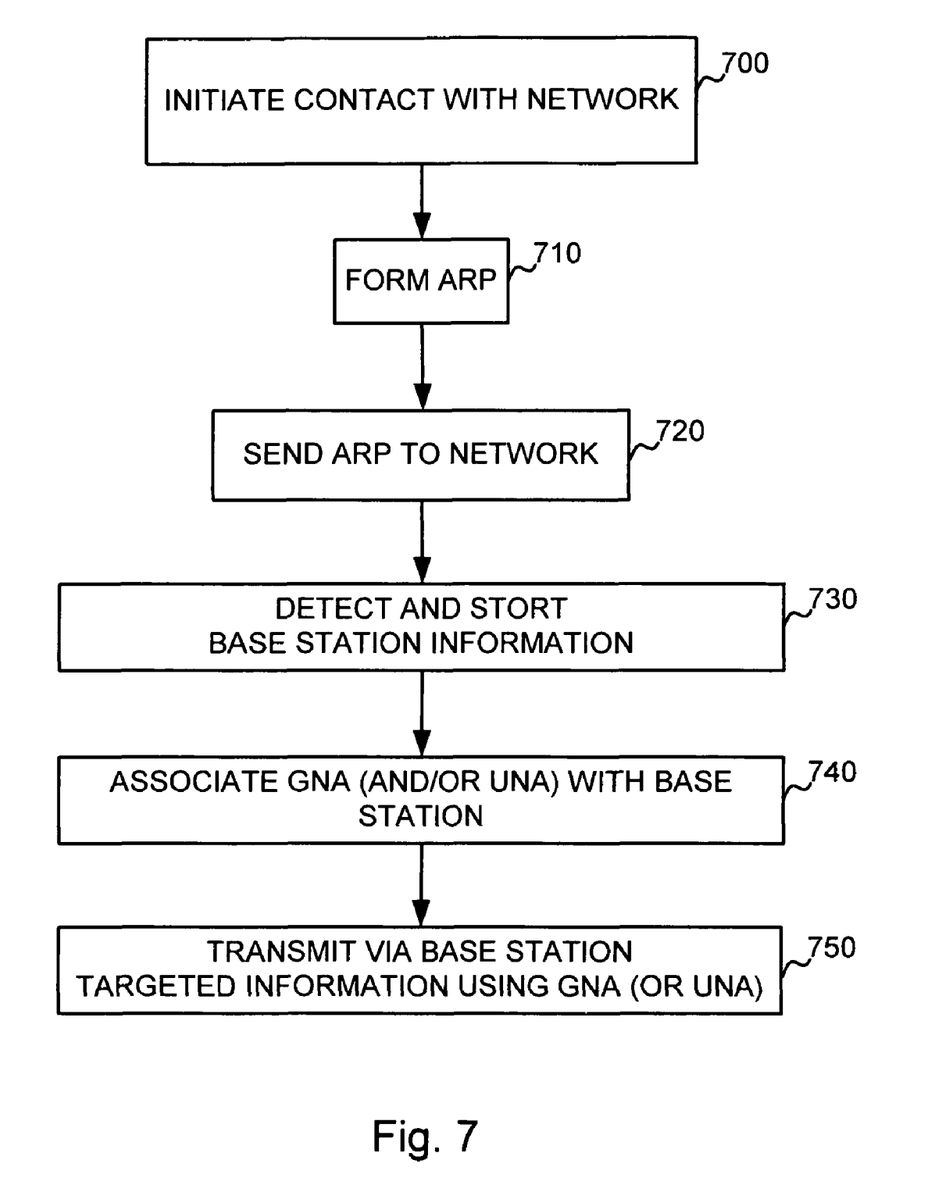
FIG. 7 is a flowchart of an exemplary series of steps in accordance with the market research aspect of the present invention.

More specifically, and as shown in FIG. 7, a set-top box (or television or any other appliance, including in this case a mobile phone or other mobile or non-mobile device) at step 700 initiates contact with network 12 to acquire a UNA. At step 710, an ARP is formed and at step 720 the ARP is transmitted to network 12. As previously explained, the ARP preferably includes a location 26 for a base station number via which communication with network 12 occurs. Then at step 730, in accordance with the market research aspect of the present invention, the base station information is detected and stored by a network service provider or a host in collaboration with the network service provider.

At step 740, the GNA of wireless device 5 is associated with the base station information in a database (not shown). Of course, if a UNA is allocated to wireless device 5, the UNA can also be associated with the base station information in the database. Then at step 750, information addressed to the GNA (or UNA) of wireless device 5 is transmitted via the base station. In this way, not all base stations need be employed to transmit the desired information. Instead, only those base stations via which registration has occurred or may have occurred are employed to transmit or broadcast information, thereby using the least amount of network resources as possible.

For a set-top box, transmitted information can include broadcast information such as a "TV guide" or offers for sale of products or services. Again, this broadcast information is preferably transmitted only via base stations that received an ARP from a wireless device 5. For a mobile wireless device, advertisements, or components thereof, can be targeted to mobile users. For example, some wireless devices only have a relatively small, text-only, display screen and thus a full motion video advertisement does need to be sent to such a device (and not sending such an advertisement thereby saves network resources). The type of device can be ascertained via the GNA or manufacturer's serial number, another quantum of information that is preferably sent in the activation request packet.

Thus, in accordance with the present invention it is possible to achieve dynamic demographic matching of customers and advertising by tracking where wireless device registration has occurred.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is required by the description of the process in the specification.

What is claimed is:

1. A method for providing targeted information, comprising:
    initiating contact with a wireless network with a wireless device, the wireless device being preprogrammed with a generic network address (GNA);
    generating, in the wireless device, an activation request message including the generic network address and base station information;
    transmitting the activation request message to the wireless network;
    detecting and storing the base station information which is indicative of the base station via which the activation request message traveled;
    associating the GNA with the base station in a database; and
    transmitting via the base station targeted information to the wireless device using the GNA as the address of the wireless device.

2. The method of claim 1, further comprising generating an activation response message including a unique network address (UNA) which is used by the wireless device.

3. The method of claim 2, further comprising transmitting the activation response message to the wireless device.

4. The method of claim 1, wherein the wireless device is a wireless telephone.

5. The method of claim 2, wherein the targeted information includes an offer for sale of a product or service.

6. A method for providing targeted information, comprising:
    initiating contact with a network with a wireless device, the wireless device being preprogrammed with a generic network address (GNA);
    generating, in the wireless device, an activation request message including the GNA and base station information;
    transmitting the activation request message to the wireless network;
    detecting and storing the base station information which is indicative of the base station via which the activation request message traveled;
    associating the GNA with the base station in a database;
    generating an activation response message including a unique network address (UNA) which is associated with the wireless device;
    transmitting the activation response message to the wireless device;
    transmitting via the base station targeted information to the wireless device using the UNA as the address of the wireless device.

7. The method of claim 6, wherein the targeted information includes an offer for sale of a product or service.

8. The method of claim 6, further comprising returning the UNA to a pool of UNAs for subsequent use by another wireless device.

9. The method of claim 6, wherein the activation request message includes a manufacturer serial number of the wireless device.

10. The method of claim 6, wherein the activation request message is transmitted to the network when an activation process is initiated without a request by the network.

11. The method of claim 6, wherein the activation request message is encrypted.

12. A method of dynamically matching a wireless device that is preprogrammed with a generic network address (GNA) with a particular geographic location and delivering a targeted information to that wireless device, comprising:
    generating, in the communication device, an activation request message including the GNA and base station information;
    transmitting the activation request message to a network, wherein the activation request message includes the base station information which is indicative of the base station via which the activation request message enters the network;
    associating the GNA with the base station in a database;

identifying the geographical location of the base station;

dynamically selecting information targeted for that geographical location; and transmitting a component of the information to the wireless device via the base station, wherein the component of the information targeted for that geographical location is transmitted to the wireless device after identifying the geographical location of the base station, which is determined after the activation request message is received by the network.

13. The method of claim 12, wherein the GNA of the wireless device is used as the address of the wireless device to transmit the information.

14. The method of claim 12, further comprising generating an activation response message including a unique network address (UNA), which is used by the wireless device.

15. The method of claim 14, wherein the UNA is used as the address of the wireless device to transmit the information.

16. The method of claim 14, further comprising returning the UNA to a pool of UNAs.

17. The method of claim 12, wherein the information is an offer for sale of a product or service.

18. The method of claim 12, wherein the wireless device is a mobile telephone.

19. The method of claim 12, wherein the activation request message includes a manufacturer serial number of the wireless device.

20. The method of claim 12, wherein the activation request message is transmitted to the network when an activation process is initiated without a request by the network.

21. The method of claim 12, wherein the activation request message is encrypted.

* * * * *

UNITED STATES PATENT AND TRADEMARK OFFICE
CERTIFICATE OF CORRECTION

PATENT NO. : 8,233,429 B1  Page 1 of 1
APPLICATION NO. : 10/294611
DATED : July 31, 2012
INVENTOR(S) : Howard Fingerhut It is certified that error appears in the above-identified patent and that said Letters Patent is hereby corrected as shown below:

In Claim 5, Column 12, Line 18, please delete "Claim 2" and replace with --Claim 1--.

Signed and Sealed this
Ninth Day of October, 2012

David J. Kappos
*Director of the United States Patent and Trademark Office*